June 10, 1947.　　H. A. ZEEH ET AL　　2,421,861
CONTROL APPARATUS
Filed Sept. 1, 1943　　2 Sheets-Sheet 1

HENRY A. ZEEH AND    Inventors
RAOUL A. VACHER
By
　　　　　Attorney

June 10, 1947.  H. A. ZEEH ET AL  2,421,861
CONTROL APPARATUS
Filed Sept. 1, 1943  2 Sheets-Sheet 2
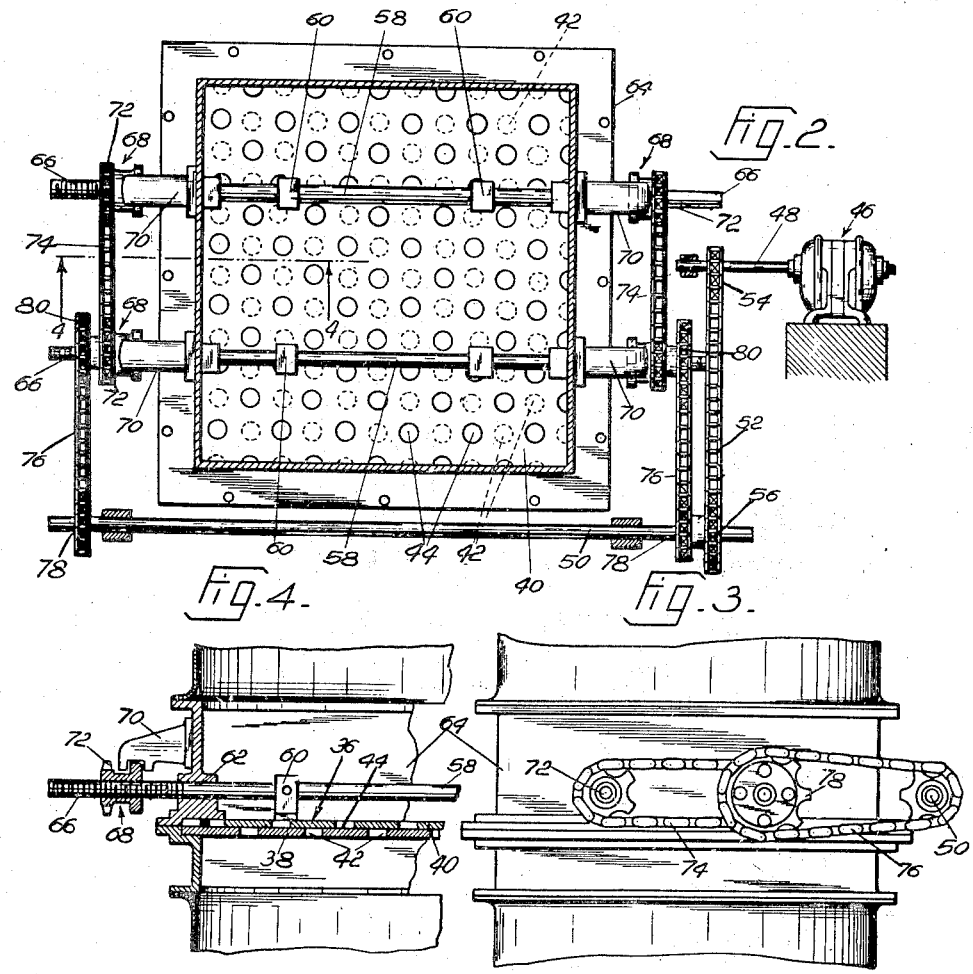
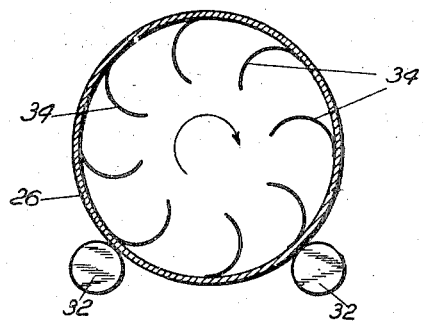
Inventors
HENRY A. ZEEH AND
RAOUL A. VACHER
By Edwin Leisohn
Attorney Patented June 10, 1947

2,421,861

UNITED STATES PATENT OFFICE 2,421,861

CONTROL APPARATUS

Henry A. Zeeh, Brooklyn, and Raoul A. Vacher, Lake View, N. Y., assignors to Rockwood & Co., Brooklyn, N. Y., a corporation of Delaware Application September 1, 1943, Serial No. 500,824

10 Claims. (Cl. 230—2)

1

This invention relates to means for controlling the flow of a gaseous medium through a conduit.

The control means of the present invention is intended primarily for regulating the flow of a hot gaseous medium through a conduit for conveying cocoa beans or other flowable material through said conduit and for heating said beans or other material while in transit through said conduit.

One object of the present invention is to provide means for automatically regulating the flow of a hot gaseous medium through a conduit in which said material is conveyed by said medium whereby to control the heating of said material by said gaseous medium.

Another object is to provide means operable automatically under the control of the pressure of said gaseous medium in the conduit through which it flows to regulate the flow of said gaseous medium in said conduit.

Another object is to provide flow-control means which is effective to maintain a predetermined and substantially constant rate of flow of a gaseous medium in a conduit.

The above and other objects, features and advantages of this invention will be fully understood from the following description, with reference to the accompanying illustrative drawings.

In the drawings:

Fig. 2 is a sectional view on the line 2—2 of Fig. 1;

Fig. 3 is a side view, in elevation, of part of the apparatus illustrated in Fig. 1;

Fig. 4 is a sectional view on the line 4—4 of Fig. 2;

Fig. 5 is a sectional view of the heating drum on the line 5—5 of Fig. 1.

Figure 1:
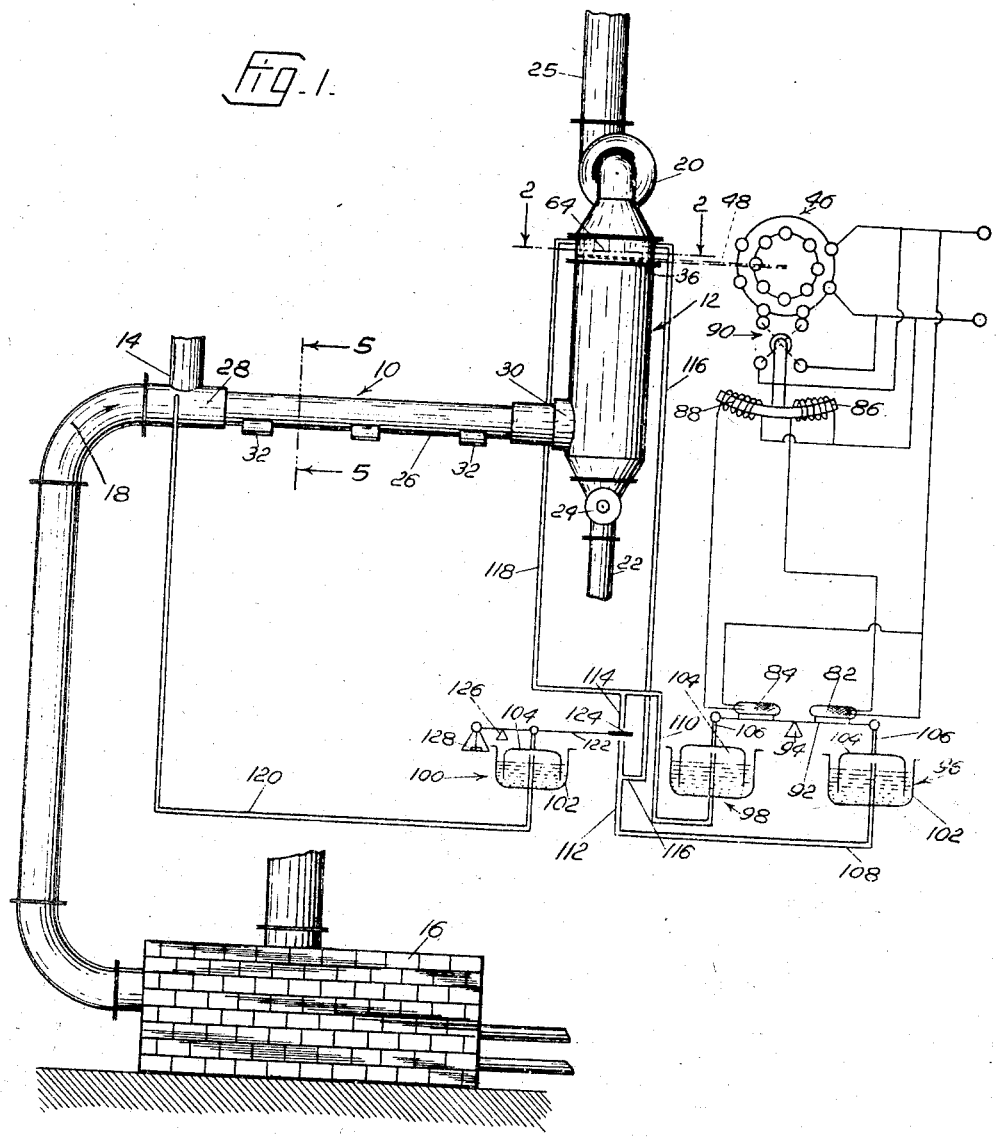
Fig. 1 is a view partly in elevation and partly diagrammatic of the apparatus embodying the present invention.

Referring now to the drawings in detail, there is illustrated an apparatus intended primarily for heating cocoa beans, but which may be used for heating and/or conveying other flowable material through a conduit. As here shown, the conduit comprises a drum 10 and a chamber 12. The beans or other material is supplied to said drum at the inlet end thereof by a pipe 14 and are conveyed through said drum into chamber 12 by a current of a hot gaseous medium supplied to said drum from the furnace 16 by a pipe 18. A suction pump or fan 20 is connected to the outlet of the chamber 12 and operates to draw the hot gases from the furnace 16 into the drum 10 and through the latter and said

2 chamber 12. When the beans or other material reach the chamber 12, they drop to the bottom thereof and are removed through the outlet 22 by a rotary air seal device 24 which prevents the entrance of air or gas into chamber 12 through said outlet while permitting the beans to pass therethrough. The outlet 25 of pump 20 is connected to a stack or any other exhaust pipe.

Drum 10 comprises a cylinder 26 which is rotatable at its opposite ends in the stationary inlet and outlet heads 28 and 30, respectively. Cylinder 26 is mounted for rotation about its longitudinal axis on rollers 32 (Figs. 1 and 5) and is rotated in any suitable way. As the beans enter the inlet head 28 at one end of rotary cylinder 26, they are carried through said cylinder by said current of a hot gaseous medium, specifically gaseous combustion products which are derived from the furnace 16 and are supplied to cylinder 26 through said pipe 18. The inner wall of cylinder 26 is provided with a plurality of circumferentially spaced curved blades 34 which are fixed to the inner surface of cylinder 26 and extend longitudinally thereof for the full length of said cylinder. Thus, as the beans are moved longitudinally of the drum toward the outlet head 30 thereof by the current of hot gases, they are also carried around by the drum, which is continuously rotating, and are cascaded from the upper part of the cylinder toward the center and lower part thereof while being moved longitudinally of the cylinder. It will be understood that the beans are conveyed through the heating drum 10 solely by the current of hot gases which thus constitute means for conveying the beans through the heating drum in addition to means for heating the beans while in transit through said drum. Accordingly, the time of heating of the beans in said drum can be controlled by regulating the flow of said hot gases which in turn regulates the flow of beans through said drum.

The flow of the hot gases through the drum 10 and the chamber 12 is controlled automatically by the control means which will now be described. Said control means comprises a valve 36 located between the outlet end of the drum 10 and the inlet of the suction fan 20. More particularly, as here shown, said valve 36 is positioned at the upper end of chamber 12 to which the inlet of said suction fan is connected. As the flow of the hot gases through drum 10 is controlled by regulating said valve, the suction fan preferably operates at constant speed. Said valve 36 comprises a stationary plate 38 and a movable plate 40. Said plates are provided with a plurality of openings 42 and 44, respectively, which register with each other in the open condition of the valve and which are out of registry with each other in the closed condition of the valve. Valve plate 40 is seated upon plate 38 and is slidable on the latter between the fully-open and fully-closed positions of the valve whereby the size of the passage through the valve can be regulated.

In accordance with the present invention, valve plate 40 is adjusted to maintain a predetermined flow of hot gases, and therefore of the beans, through the heating drum 10, in such manner as to maintain said flow of gases and beans at uniform rates, respectively. The means for adjusting valve 36 comprises a reversible motor 46 which is operatively connected to valve plate 40 for moving the same in relation to plate 38. The shaft 48 of said motor is connected to a rotary shaft 50 by a sprocket chain 52 which is driven by the sprocket wheel 54 fixed to the motor shaft and which drives the sprocket wheel 56 fixed to said shaft 50. Rods 58 are fixed to valve plate 40 by means of companion lugs 60 and are slidable in companion bearings 62 provided in the valve casing 64. Each of said rods is provided with a screw threaded part 66 which is engaged by a companion nut 68 which is free to rotate with respect to the companion rod which is held against longitudinal movement by a companion member 70. It will be understood that when nuts 68 are rotated, the companion rods 58 are moved longitudinally and thereby move valve plate 40 on plate 38 for regulating the size of the passage through the valve. Each nut 68 is provided with a sprocket wheel 72. The sprocket wheels 72 of pairs of nuts are connected as illustrated in Fig. 2 by sprocket chains 74. Two of the nuts 68 are rotated by shaft 50 and for that purpose are operatively connected to said shaft by the sprocket chains 76 connected to sprocket wheels 78 fixed to said shaft and to sprocket wheels 80 fixed to said two nuts 68. It will be understood that when motor 46 is rotated in one direction, valve plate 40 is moved in a direction for closing or partially closing the passage through the valve and that when said motor is reversed, valve plate 40 is moved in the opposite direction for opening or partially opening the passage through said valve. Accordingly, by controlling the operation of motor 46, valve 36 is regulated.

In accordance with the present invention, the operation of motor 46 for regulating valve 36 is accomplished automatically under the control of the pressure of the gaseous medium at the inlet end of the heating drum 10. The means provided for this purpose comprises as here shown the mercury switches 82 and 84 connected, as illustrated in Fig. 1, to the relays 86 and 88, respectively, for operating the reversing switch 90 of motor 46. Said switches 82 and 84 are mounted for tilting movement on a lever 92 pivoted between the ends thereof on a fulcrum 94. In the normal horizontal position of lever 92, corresponding to the desired flow of gases through the heating drum 10, both switches are open. Said lever is pivoted in one direction or the other for closing either switch 82 or switch 84 under the control of the pressure-responsive devices 96 and 98 which are in turn controlled by the pressure-responsive device 100. Each of said devices is of substantially the same construction and comprises a liquid receptacle 102 containing a liquid for forming a liquid seal at the lower end of the inverted open bottom chamber-forming member 104. Member 104 is closed at its top and a predetermined quantity of air is contained therein above said liquid. Members 104 of pressure-responsive devices 96 and 98 are pivotally connected to the opposite ends of lever 92 by rods 106. The air chambers in members 104 of pressure-responsive devices 96 and 98 above the liquid therein are connected by means of tubes 108 and 110, respectively, to tubes 112 and 114, respectively, which are open at their ends. Said tubes 112 and 114 are connected to tubes 116 and 118, respectively, which communicate with valve casing 64 at the outlet side of valve 36. The air chamber of pressure-responsive device 100 is connected by means of a tube 120 to the stationary head 28 at the inlet end of the heating drum 10. Member 104 of said last mentioned pressure-responsive device is connected to a lever 122 which operates a valve 124 for opening and closing the ends of tubes 112 and 114. Said lever is mounted on the fulcrum 126 and is provided with a counterweight 128.

When the gas pressure at the inlet end of the heating drum is normal, valve 124 is in its neutral position out of engagement with the ends of tubes 112 and 114, and likewise the switches 82 and 84 are open. Assuming that the pressure at the inlet end of the rotary drum is below normal thereby indicating an abnormally high rate of flow of gases through said drum, the pressure in the chamber of pressure-responsive device 100 is decreased, thus allowing member 104 of said device to move downwardly in the companion receptacle 102 thereof, thereby resulting in the closing of tube 112 by valve 124. When valve 124 is thus closed, the suction fan 20 operates to reduce the pressure in the chamber of pressure-responsive device 96 so that member 104 of said device is lowered, thus closing switch 82 which, through relay 86, operates the switch 90 of motor 46 whereby the latter is operated in a direction for moving valve plate 40 toward its valve closing position. As soon as the valve plate 40 has moved sufficiently to restrict the passage through the valve to the extent required for reducing the flow of gases through the heating drum, an increase of pressure takes place at the inlet end of said drum and is communicated to the chamber of pressure-responsive device 100. Upon an increase of pressure in the chamber of pressure-responsive device 100, valve 124 is moved to a position for opening tube 112 and normal pressure is restored in the chamber of pressure-responsive device 96, whereby switch 82 is moved to its open position. On the other hand, if the pressure in the chamber of pressure-responsive device 100 is increased in response to the abnormal increase of pressure at the inlet of drum 10, valve 124 is moved to a position in which it closes the end of tube 114, and thereupon the pressure in the chamber of pressure-responsive device 98 is lowered so that switch 84 is closed, thus reversing the operation of electric motor 46 so that it operates to move valve plate 40 in valve opening direction to increase the size of the passage through valve 36, thus enabling suction fan 20 to reduce the pressure at the inlet side of the drum 10.

In the operation of the apparatus, the valve plate 40 is moved a comparatively short distance in either direction for increasing or decreasing the size of the passage through valve 36, as may be required to maintain substantially constant the flow of hot gases through drum 10. The control apparatus is sensitive to pressure changes at the inlet end of the drum and responds quickly to control the operation of the valve actuating mechanism by the motor 46. If desired, limit switches (not shown) may be provided for interrupting the circuit of motor 46 whereby to stop said motor and the movement of valve plate 40 in case said plate is moved beyond its limit of travel in either direction or the same result may be accomplished by providing a slip-clutch in shaft 48.

While we have shown and described the preferred embodiment of our invention, it will be understood that the invention may be embodied otherwise than as herein specifically illustrated or described and that in the illustrated embodiment certain changes in the details of construction and in the arrangement of parts may be made. Accordingly, we do not wish to be limited to the construction herein specifically illustrated or described except to the extent which may be required by the scope of the appended claims.

Having thus described our invention, what we claim and desire to secure by Letters Patent is:

1. Means for regulating the flow of a gaseous medium through a conduit having an inlet and an outlet, said means comprising a valve for controlling said outlet, means for adjusting said valve, means responsive to the pressure of said gaseous medium at said outlet of the conduit for controlling the operation of said valve-adjusting means, and means responsive to the pressure of said gaseous medium at the inlet end of said conduit for controlling the operation of said first mentioned pressure-responsive means.

2. Apparatus of the character described comprising a conduit for a gaseous medium, said conduit having an inlet and an outlet for said medium, means operatively connected to said outlet for drawing said gaseous medium through said conduit, a valve for controlling the outlet of said conduit, means for adjusting said valve comprising valve-actuating mechanism and electrically operated means for actuating said mechanism, and means responsive to the pressure of said gaseous medium at said outlet for controlling the operation of said electrically operated means, and means responsive to the pressure of said gaseous medium at the inlet end of said conduit for controlling the operation of said first mentioned pressure-responsive means.

3. In apparatus of the character described which comprises a conduit for a gaseous medium, said conduit having an inlet and an outlet for said medium, and a suction pump having its intake operatively connected to said outlet for drawing through said conduit the gaseous medium supplied to said inlet; means for regulating the flow of said medium through said conduit comprising a valve for controlling said outlet, means for adjusting said valve comprising valve operating mechanism, and a reversible motor for actuating said mechanism, a reversing switch connected to said motor for controlling the direction of rotation thereof, means responsive to the pressure of said gaseous medium at the outlet of said conduit for actuating said reversing switch, and means responsive to the pressure of said gaseous medium at the inlet end of said conduit for controlling the operation of said first mentioned pressure-responsive means.

4. Apparatus of the character described comprising a conduit for a gaseous medium, said conduit having an inlet and an outlet, means operatively connected to said outlet for drawing said gaseous medium through said conduit, a valve at said outlet for controlling the flow of said gaseous medium through said conduit, means for adjusting said valve, and means operable under the joint control of the pressure of said gaseous medium at said inlet and said outlet for actuating said valve-adjusting means.

5. Apparatus of the character described comprising a conduit for a gaseous medium, said conduit having an inlet and an outlet for said medium, means operatively connected to said outlet for drawing said gaseous medium through said conduit, means comprising a valve and valve actuating mechanism for controlling the flow of said gaseous medium through said conduit, a reversible motor for actuating said mechanism, a reversing switch for said motor, and means responsive jointly to pressure of said gaseous medium at said inlet and said outlet for controlling the operation of said reversing switch.

6. Apparatus of the character described comprising a conduit for a gaseous medium, said conduit having an inlet and an outlet for said medium, means operatively connected to said outlet for drawing said gaseous medium through said conduit, means comprising a valve and valve actuating mechanism for controlling the flow of said gaseous medium through said conduit, a reversible motor for actuating said mechanism, a reversing switch for said motor, electrically operated means for operating said reversing switch, switching means for controlling the operation of said electric operated means, and means responsive jointly to pressure of said gaseous medium at said inlet and said outlet for controlling the operation of said switching means.

7. Apparatus of the character described comprising a conduit for a gaseous medium, said conduit having an inlet and an outlet for said medium, means operatively connected to said outlet for drawing said gaseous medium through said conduit, means comprising a valve and valve actuating mechanism for controlling the flow of said gaseous medium through said conduit, a reversible motor for actuating said mechanism, a reversing switch for said motor, electrically operated means for operating said reversing switch, switching means for controlling the operation of said electric operated means, outlet pressure-responsive means for actuating said switching means, and fluid-pressure means operable under the control of the inlet pressure of said gaseous medium for controlling the operation of said first mentioned pressure-responsive means.

8. In apparatus of the character described comprising a conduit having an inlet and an outlet for a gaseous medium, and a suction pump having its intake operatively connected to said outlet for drawing through said drum the gaseous medium supplied to said inlet; means for regulating the flow of said gaseous medium through said conduit comprising a valve for controlling said outlet, means including a reversible motor for adjusting said valve, a reversing switch for said motor, electrically operated means for operating said reversing switch, switching means for controlling the operation of said electric operated means, and means responsive jointly to the pressure of said gaseous medium at said inlet and said outlet for controlling the operation of said switching means.

9. In apparatus of the character described comprising a conduit having an inlet and an outlet for a gaseous medium, and a suction pump having its intake operatively connected to said outlet for drawing through said drum the gaseous medium supplied to said inlet; means for regulating the flow of said gaseous medium through said conduit comprising a valve for controlling said outlet, means including a reversible motor for adjusting said valve, a reversing switch for said motor, electrically operated means for operating said reversing switch, switching means for controlling the operation of said electric operated means, means responsive to the pressure of said gaseous medium at said outlet for actuating said switching means, and means responsive to the pressure of said gaseous medium at said inlet for controlling the operation of said first mentioned pressure-responsive means.

10. Means for regulating the flow of a fluid through a conduit having an inlet, an outlet and an adjustable valve between said inlet and outlet, the fluid flow being induced by suction applied at the outlet side of said valve, said regulating means comprising two fluid-pressure-responsive devices, tubes connecting said pressure-responsive devices, respectively, to said conduit at the outlet side of said valve, means operable under the control of said pressure-responsive devices for adjusting said valve to regulate the flow of fluid through said conduit, each of said tubes having an opening to the atmosphere, valve means for controlling said openings, and a pressure-responsive device operable under the control of the fluid-pressure at the inlet of said conduit for actuating said valve means to close one and to open the other of said openings under one condition of fluid-pressure at said inlet and to close the other of said openings and to open said one opening under another condition of fluid-pressure at said inlet.

HENRY A. ZEEH.
RAOUL A. VACHER.

REFERENCES CITED

The following references are of record in the file of this patent:

UNITED STATES PATENTS

| Number | Name | Date |
| --- | --- | --- |
| 2,169,150 | Johnson | Aug. 8, 1939 |
| 2,217,364 | Halford et al. | Oct. 8, 1940 |
| 2,127,589 | Erban | Aug. 23, 1938 |
| 1,658,577 | Smoot | Feb. 7, 1928 |
| 302,206 | Krutsch | July 15, 1884 |
| 560,707 | Good | May 26, 1896 |
| 775,878 | Wellman | Nov. 22, 1904 |